April 26, 1932.  M. J. FIRSTY  1,855,908
AUTO HATRACK
Filed March 15, 1930
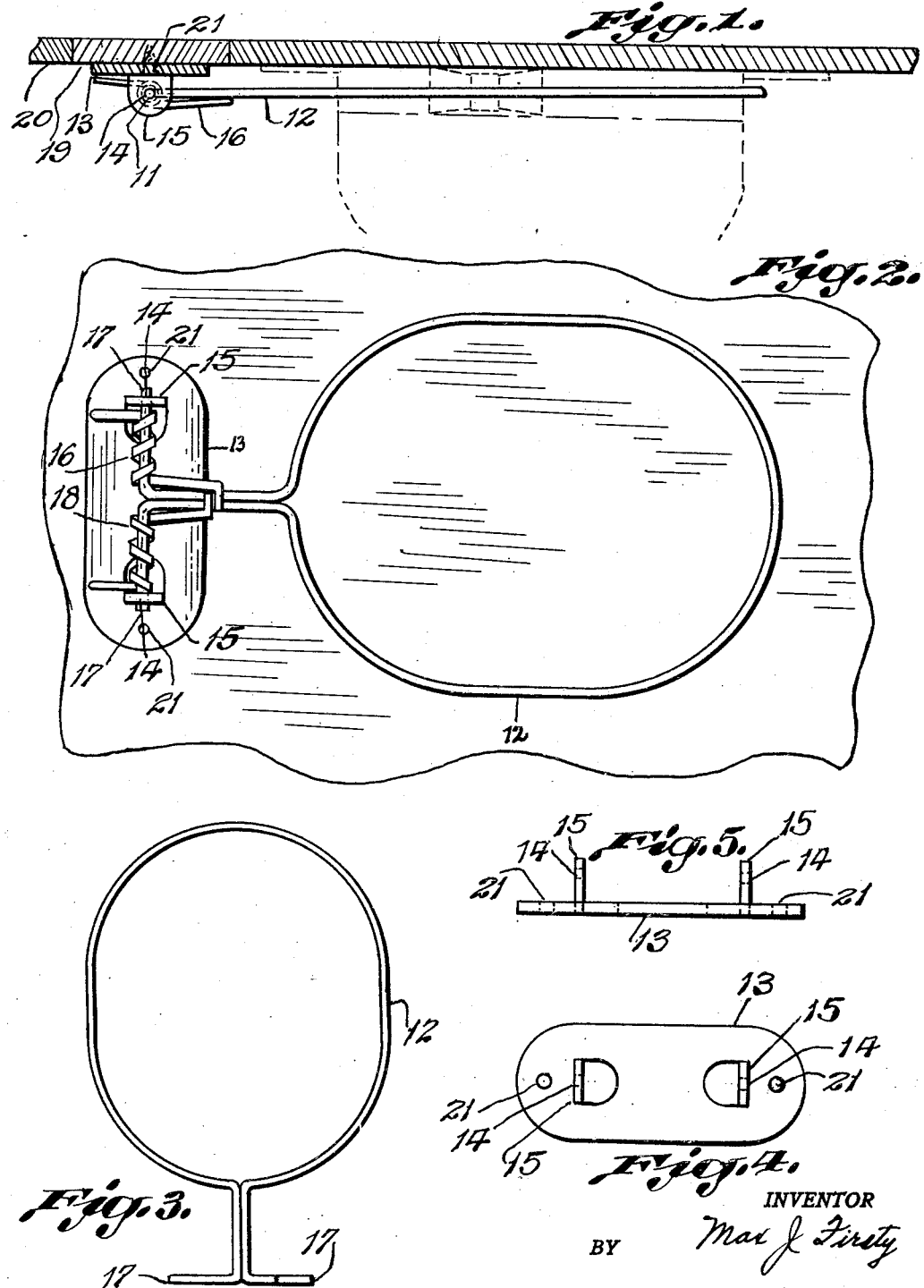

Patented Apr. 26, 1932

1,855,908

UNITED STATES PATENT OFFICE

MAX J. FIRSTY, OF NEW YORK, N. Y.

AUTO HATRACK

Application filed March 15, 1930. Serial No. 436,209.

My present invention relates to a hat rack, and has for its prime object to provide a suitable, safe and convenient place to dispose of hat when not in use.

Another important object of the invention lies in the provision of placing the invention on inner roof of auto, where it will not interfere with, nor inconvenience the passengers.

A still further important object of the invention lies in the provision of a collapsible and foldable hat rack of this nature which is exceedingly simple in its construction, inexpensive to manufacture, compact and convenient, thoroughly reliable and efficient, and otherwise well adapted for the purpose for which it is designed.

With the above and numerous other objects in view, as will appear as the description proceeds, the invention resides in certain novel features of construction and in the combination and arrangement of parts, as will be hereinafter more fully described and claimed.

In the drawings:

Figure 1 is a side view of my invention.

Fig. 2 is a front view of same, showing detail parts in proper position.

Fig. 3 is a front view of frame.

Fig. 4 is front view of metal base of invention.

Fig. 5 is a side view of same.

In the drawings, Fig. 1 shows the oval frame 12 with its protruding ends 17—17 placed in position in holes 14—14 of flanges 15—15 that are protruding from the metal base 13. The frame 12 is held in position for resiliency by springs 16 and 18, which also act as supports to keep the oval frame 12 in position in flanges 15—15 protruding from metal base 13, which is fastened to supporting cross-bows 19 of the inner roof 20 of an automobile or other vehicle, by holes 21—21. Thus when the metal base 13 is secured to cross-bows 19 of roof 20, the frame 12 is held by springs 16 and 18 in a firm position flatly against the inner roof 20 of the automobile or other vehicle.

The frame 12 is composed of an oval portion which connects with a stem portion terminating in the said protruding ends 17—17. These ends are on opposite sides of the stem. The spring 16 is coaxially upon one of the ends and the spring 18 is coaxially on the other end. The outer ends of each of the springs 16 and 18 act against the base member 13, while the inner ends have portions which are substantially parallel with the stem of the frame 12 and then terminate in tips directed towards each other and engaging beneath the stem of the frame.

The frame 12 may be engaged in the flanges 15 by first engaging one end 17 of the frame in one flange, compressing the spring 18 until it is possible to engage the other end 17 of the frame in the other flange, and then by releasing the frame, the springs 16 and 18 bring it to a neutral position. Of course, springs 16 and 18 are of the compressible type.

In using my invention, the oval frame 12 is pulled down, the hat is inserted into the frame 12, and the resiliency of springs 16 and 18 forces the frame 12 back, holding the hat in an inverted position flatly against the roof of an automobile or other vehicle.

I claim:

A device of the class described, comprising a base member for attachment upon the roof of a vehicle or the like and having spaced flanges, a frame having an oval portion connected with a stem portion terminating in oppositely protruding ends pivotally engaged in said spaced flanges so as to pivotally support the frame, and springs coaxially arranged on said protruding ends and having their outer ends engaging against said base member and their inner ends formed with portions extending substantially parallel along the stem of the frame and terminating in inwardly turned tips extending across the bottom of the stem, said springs being loosely wound so as to be compressible, whereby the springs serve the function of normally urging the frame into a horizontal position and the simultaneous function of holding the protruding ends within the flanges in a manner so that the frame may be first moved laterally in one direction to disengage one of the protruding ends from its supporting flange and then in the other direction to completely remove the frame from the base and plate.

In testimony whereof I affix my signature.

MAX J. FIRSTY.